United States Patent [19]

Takeyama et al.

[11] 4,299,599
[45] Nov. 10, 1981

[54] WATER PRODUCING APPARATUS

[75] Inventors: Tetsu Takeyama; Kenkoku Azuma; Akira Ikeda; Toshie Yamamoto; Shigeho Katsurada, all of Amagasaki, Japan

[73] Assignee: Mitsubishi Denki Kabushiki Kaisha, Tokyo, Japan

[21] Appl. No.: 147,115

[22] Filed: May 6, 1980

[30] Foreign Application Priority Data

| May 9, 1979 | [JP] | Japan | 54-57766 |
| May 15, 1979 | [JP] | Japan | 54-59849 |
| Jul. 3, 1979 | [JP] | Japan | 54-85671 |

[51] Int. Cl.³ .............................................. B01D 53/04
[52] U.S. Cl. ........................................ 55/180; 55/208; 55/387
[58] Field of Search ................ 55/31, 33, 160, 161, 55/179, 180, 208, 387

[56] References Cited

U.S. PATENT DOCUMENTS

| 2,138,689 | 11/1938 | Altenkirch | 55/33 X |
| 2,248,225 | 7/1941 | Fonda | 55/162 |
| 2,278,854 | 4/1942 | Hunsicker | 55/161 |
| 2,328,521 | 8/1943 | Wittmann | 55/33 X |
| 2,732,027 | 1/1956 | Wallin | 55/162 |
| 2,761,292 | 9/1956 | Coanda et al. | 55/208 X |
| 3,400,515 | 9/1968 | Ackerman | 55/33 X |
| 4,146,372 | 3/1979 | Groth et al. | 55/33 |

FOREIGN PATENT DOCUMENTS 1211101 11/1970 United Kingdom .................. 55/179

Primary Examiner—Robert H. Spitzer
Attorney, Agent, or Firm—Oblon, Fisher, Spivak, McClelland & Maier

[57] ABSTRACT

A water producing apparatus for producing liquid water from a moisture in the ambient air by an adsorbent. Two columns holding the adsorbent are combined with a blower for feeding the air into the column and a condenser for condensing the desorbed steam obtained by heating the adsorbent adsorbing water. The blower and the condenser are commonly used for the two columns so as to minimize pipes and to save a consumption of energy caused by a pressure loss.

2 Claims, 43 Drawing Figures

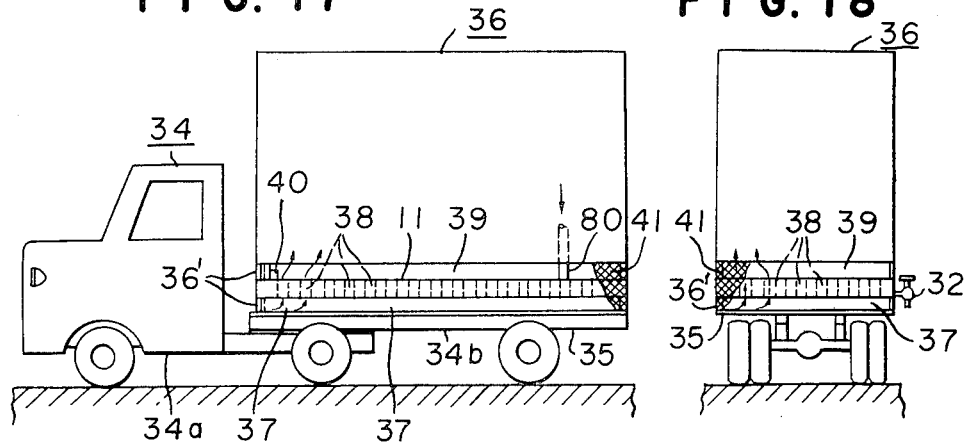
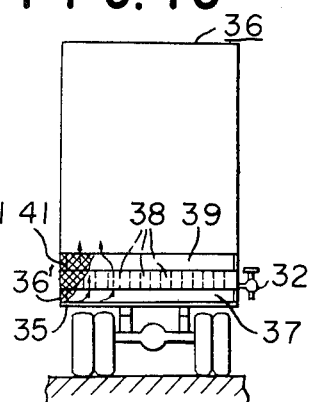
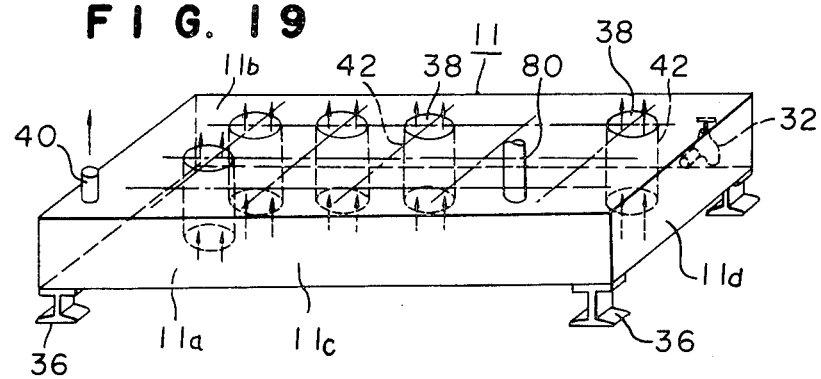
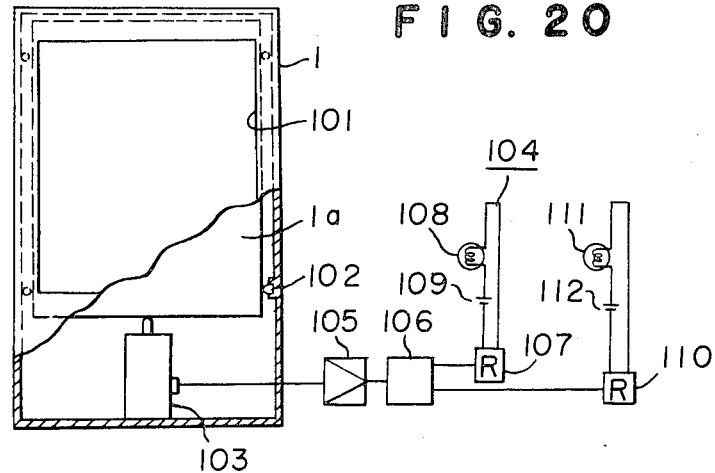

F I G. 32
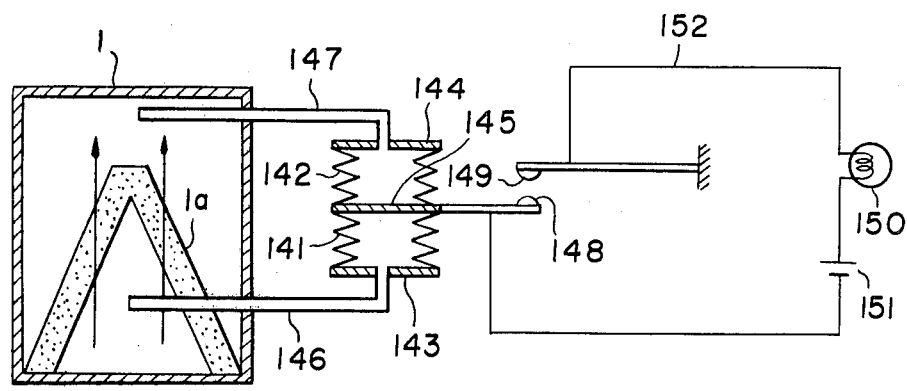
F I G. 33
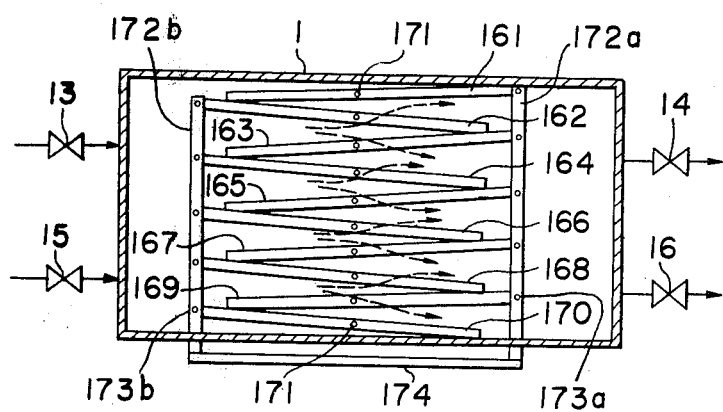

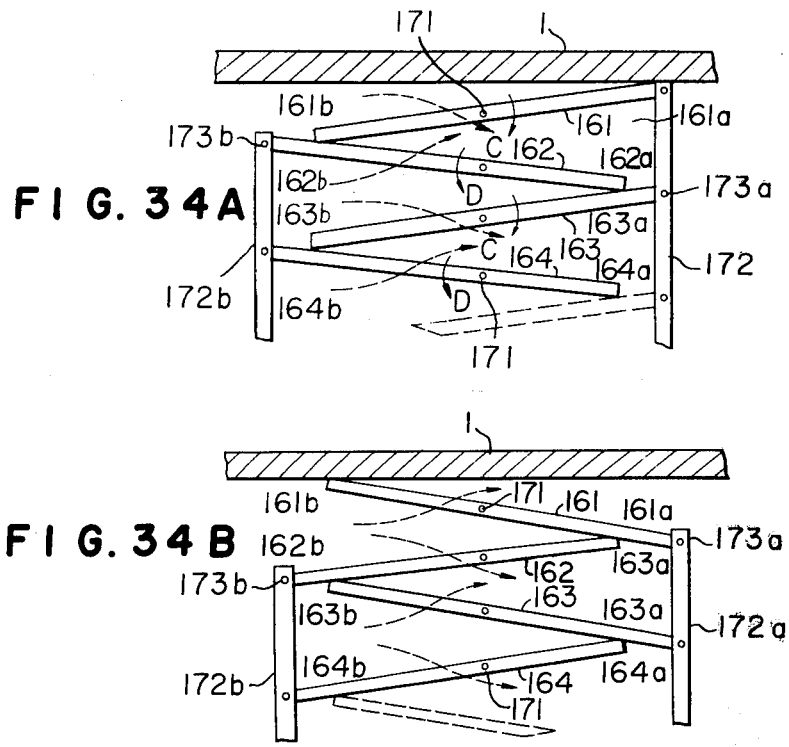
FIG. 34A
FIG. 34B
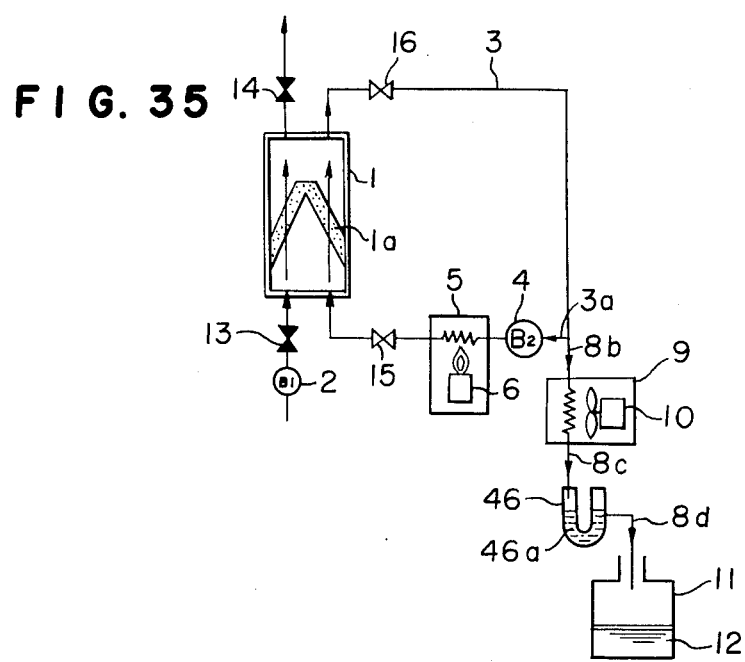
FIG. 35 ated apparatus for producing liquid water from moisture in air.

2. Description of the Prior Arts:

A water producing apparatus for producing a desalted water from sea water has been well-known as an apparatus for converting sea water into a desalted water. A water treating apparatus for treating a waste water such as drainage in high degree to obtain water having high clarity has been proposed. This is one of the water producing apparatus classified in the apparatus for converting sea water into a desalted water. These apparatuses require a solution containing liquid water as a main component for producing water. Thus, these water producing apparatus could not be used to produce water in a place where no liquid water is found such as desert since the liquid water is used as the source.

It has been required for providing a water producing apparatus for producing water even in a place where no liquid water is found. A novel water producing apparatus has been developed.

The water producing apparatus is an apparatus for producing water from a moisture in the air and is a novel water producing apparatus which can produce water in any place as far as the air is present. Of course, it is impossible to produce water if no moisture is present in the air. According to the static data for weather and the results of inventors' studies, even in the air in a large desert at the central part of Arabian land, 3 to 4 g. of water is included in 1 m³ of the air, and accordingly, water can be produced. Thus, water can be obtained in a sterile land to live and to work and water can be used for irrigation to culture plants. The present invention contributes to expand living zones for human-beings and is quite important.

The principle of the apparatus is to produce water by adsorbing moisture in the air on an adsorbent as the first step and then, desorbing water adsorbed as steam by heating the water-adsorbed adsorbent and condensing the steam in a condenser as the second step. The adsorbent is dehydrated to recover the adsorbing function whereby the adsorbent can be repeatedly used for adsorbing moisture in air. Thus, liquid water can be repeatedly obtained from air.

FIG. 1 is a diagram of one embodiment of the water producing apparatus based on the basic principal in the prior art.

In FIG. 1, the references (1A), (1B) respectively represent a first and second columns which respectively hold an adsorbent layer (1a) and an adsorbent layer (1b); (2) designates a sucking blower as a means for sucking a gas containing a moisture as air into the first column (1A) or the second column (1B); (3) designates a recycling passage of a gas which connects to the first column (1A) or the second column (1B); (4) designates a blower for recycling the gas in the recycling passage to the arrow line direction A; (5) designates a heater for heating the gas in the recycling passage (3), and the heater (5) heats the adsorbent layer (1a) or the adsorbent layer (1b) so as to dehydrate the adsorbed water; (6) designates a burner as a heating source; (7) designates a combustion blower for feeding a fuel or air for combustion into the burner (6); (8) designates a passage of a gas branched from the recycling passage (3); (9) designates a condenser for condensing steam in the passage (8); (10) designates a cooling blower for cooling the condenser (9); (11) designates an air open type water receiver in which liquid water condensed by the condenser (9) is stored; (12) designates the liquid water produced; and (13a), (13b), (14a), (14b), (15a), (15b), (16a) and (16b) respectively designate valves for switching the corresponding flow of the gas.

The operation of the conventional apparatus will be illustrated.

In the conventional water producing apparatus, two columns are equipped. When one column is in the adsorbing step (first step), the other column is in the desorbing step (second step). When these steps are completed, the steps can be alternately switched and repeated to attain continuously the desorbing step.

In the following description, it will be stated the condition that the first column part (1A) is in the adsorbing step and the second column part (1B) is in the desorbing step.

In the adsorbing step in the first column (1A), the valves (13a), (14a) are opened and the valves (13b), (14b), (15a), (16a) are closed and the blower (2) is driven to suck the ambient air into the first column (1A) to contact it with the adsorbent layer (1a) held in the first column. In the step, the moisture is adsorbed from the air in the adsorbent layer (1a). The dried air is discharged through the valve (14a) out of the system. Thus, the adsorbing step is completed in the step of adsorbing the moisture in the adsorbent layer to be enough. On the other hand, the desorbing step, in the second column (1B), is preferably carried out in parallel to the adsorbing step in the first column (1A). That is, the valves (13b), (14b), (15a), (16a) are closed and the valves (15b), (16b) are opened. The gas (air) in the recycling passage (3) is heated by the heater (5) and is recycled to the arrow direction by the blower for recycling (4). Thus, the adsorbent layer (1b) in the second column (1B) is heated by the heated air whereby the water adsorbed in the adsorbent layer (1b) is desorbed as steam.

When the steam is desorbed from the adsorbent layer (1b), the volume of the gas in the recycling passage (3) is increased by the formation of the steam by the desorption and the temperature rising. The volumetrically expanded gas in the recycling passage (3) is discharged together with the desorbed steam through the condenser (9) into the ambient air. The steam in the gas flowed from the recycling passage (3) is condensed in the condenser (9) to store in the water receiver (11). The steam corresponding to the saturated steam pressure given depending upon the temperature of the condenser (9) is discharged into the ambient air as a loss. Thus, the air in the second column (1B) at the beginning is only small in comparison with the desorbed steam, and the quantity is limited. Therefore, all of the air is purged by the formed steam whereby only steam is substantially recycled in the recycling passage (3). In the condition for only steam, the pressure in the recycling passage (3) is always about 1 atm. since the passage is opened through the condenser (9) into the ambient air.

The gas recycling in the recycling passage (3) is only steam. The steam corresponding to the desorbed steam is fed into the condenser (9) to form water and water is stored in the water receiver (11). Thus, the desorbing step is completed by desorbing water in the adsorbent layer (1b) to be enough.

The adsorbing step and the desorbing step described above are alternately carried out in the first and second columns (1A), (1B) whereby liquid water can be continuously obtained from the moisture in the ambient air.

Thus, in the water producing apparatus in the prior art, many pipes for the passages of the gas and many valves for opening and closing the passages have been used. The operation is complicated. It has disadvantages for forming a compact and transferable structure.

In a desert in which the water producing apparatus is effectively used, even electricity is not easily obtained and, of course, liquid water is not easily obtained. It is necessary to save the energy as far as possible. Therefore, a pressure loss in the pipes and valves which cause energy consumption of the blowers (2), (4) should be minimized. The capacity of the blower for cooling (10) is preferably minimized in a range for maintaining the water producing ability of the condenser (9). The water producing apparatus in the prior art has the problem from a viewpoint of the energy saving.

SUMMARY OF THE INVENTION

It is an object of the present invention to provide a compact and transferable water producing apparatus which has not said disadvantages and has a structure for eliminating the blower for cooling used in a condenser for liquid water with small numbers of pipes for gas passages and valves for opening and closing the passages to save energy.

The water producing apparatus of the present invention comprises at least two columns which hold each adsorbent layer for adsorbing a moisture and have each inlet and each outlet for a gas at both sides of the adsorbent layer; a door means for opening and closing the inlet and the outlet of each column; a common chamber (sucking or discharging) connected to the inlet (or the outlet) of each column; a feeding means for feeding the gas containing the moisture into the column in the adsorbing step under opening the door means and said means being placed in the chamber; a heating chamber for heating the gas in the desorbing step of the column and said chamber being connected to the inlet and the outlet through the column and the adsorbent layer, a recycling means for recycling the gas heated by the heating chamber through the recycling passage formed by the column in the desorbing step and the heating chamber by closing the door means thereby heating the adsorbent layer to desorb the adsorbed water from the adsorbent layer; a condenser for condensing the desorbed steam fed through a pipe into the recycling passage, by cooling it with the gas fed by the feeding means. The columns are alternately changed to be the adsorbing step in one column and to be the desorbing step in the other column. The pipes and valves for the passages of the gas are minimized in comparison with the water producing apparatus in the prior art, whereby the operation is simple, and the structure can be compact and transferable structure. The pressure loss caused by the pipes and valves is reduced and the blower for cooling the condenser can be eliminated to easily save the energy.

BRIEF DESCRIPTION OF THE DRAWINGS

FIGS. 6 to 41 show the other embodiments of the water producing apparatus of the present invention.

DETAILED DESCRIPTION OF THE PREFERRED EMBODIMENTS

Figure 3:
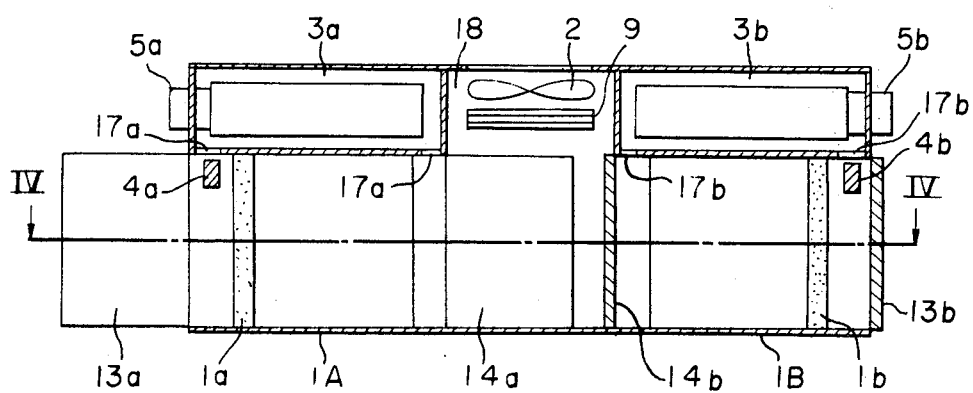
FIGS. 2 to 4 are a plan view, a sectional side view and a sectional plan view of one embodiment of the water producing apparatus of the present invention.
Figure 2:
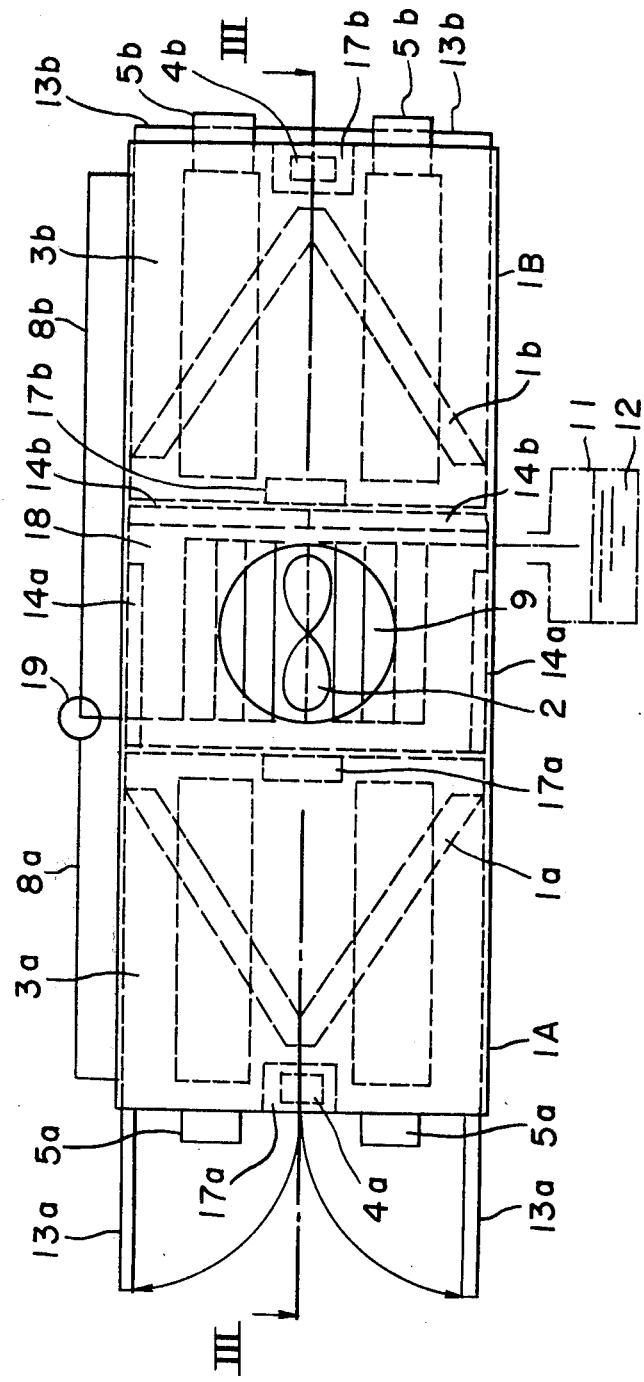
Figure 4:
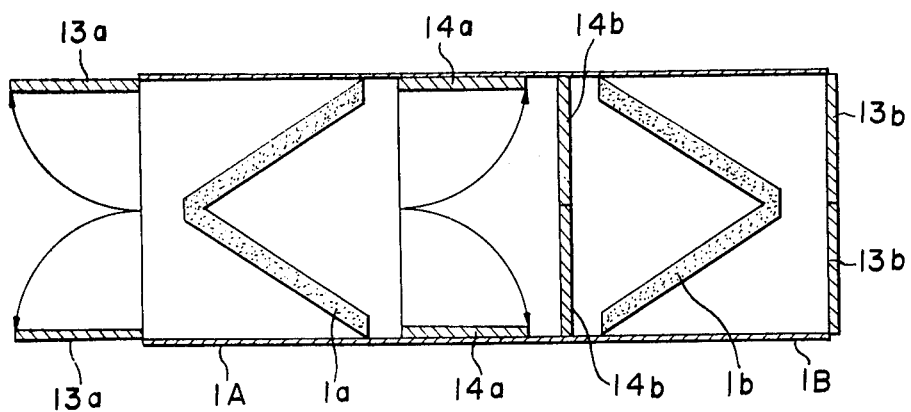

FIG. 2 is a schematic plan view of the water producing apparatus of the first embodiment of the present invention; FIG. 3 is a sectional view taken along the line III—III of FIG. 2; and FIG. 4 is a sectional view taken along the line IV—IV of FIG. 3.

In the Figures, the reference numerals (1A), (1B) respectively designate the first and second columns which are cyclindrical tubes having a rectangular sectional view and hold each adsorbent layer (1a), (1b); (17a) designates ports of a gas formed on the upper side plate at the opening ends of the first column (1A) in both sides of the adsorbent layer (1a); (17b) designates ports of a gas formed on the upper side plate at the opening ends of the second column (1B) in the both sides of the adsorbent layer (1b); (3a) designates a heating chamber for heating the gas fed through the ports (17a) formed on the upper side plate of the first column (1A); 3b) designates a heating chamber for heating the gas fed through the ports (17b)formed on the upper side plate of the second column (1B); (5a), (5b) respectively designate heaters for heating the gas in the heating chambers (3a), (3b); (18) designates an air discharge chamber which connects the port of the first column (1A) at the outlet of air and the port of the second column (1B) at the outlet of air; (2) designates a sucking blower for sucking the ambient air through the first or second column (1A), (1B) equipped near the outlet of air which is formed at the upper part of the chamber (18); (9) designates the condenser equipped in the chamber (18) to be cooled by the blower (2); (13a) designates a double sheet door at the inlet which is fitted at each edge of each side plate at the inlet for sucking air into the first column (1A) by the blower (2); (14a) designates a double plate door at the outlet which is fitted at each edge of each side plate at the outlet for discharging air from the first column (1A) by the blower (2); (13b) and (14b) respectively double plate doors at the inlet and at the outlet of the second column (1B) which have the same structures as those of the double plate doors (13a), (14a) of the first column (1A); (4a) designates a blower for recycling which is placed near the port (17a) and recycles, through the port (17a), the hot air heated in the heating chamber (3a) into the recycling passage formed by the first column (1A) and the heating chamber (3a) by closing the inlet door (13a) and the outlet door (14a) whereby the adsorbent layer (1a) is heated to desorb the adsorbed water from the adsorbent layer (1a); (4b) designates a blower for recycling which is placed near the port (17b) and recycles, through the port (17b), the hot air heated in the heating chamber (3b) into the recycling passage formed by the second column (1B) and the heating chamber (3b) by closing the inlet door (13b) and the outlet door (14b) whereby the adsorbent layer (1b) is heated to desorb the adsorbed water from the adsorbent layer (1b); (8a) and (8b) respectively designate passages of the gas which are respectively connected to the recycling passage formed by the first column (1A) and the heating chamber (3a) and the recycling passage formed by the second column (1B) and the heating chamber (3b); (19) designates a directional control valve for alternately changing the connection of the other end of the passage (8a) and the condenser (9) and the connection of the other end of the passage (8b) and the condenser (9); (11) shown by the one dot chain line designates an air open type water receiver for storing liquid water obtained by the condenser (9) and (12) shown by the one dot chain line designates the resulting liquid water.

The operation will be illustrated in detail.

Figure 1:
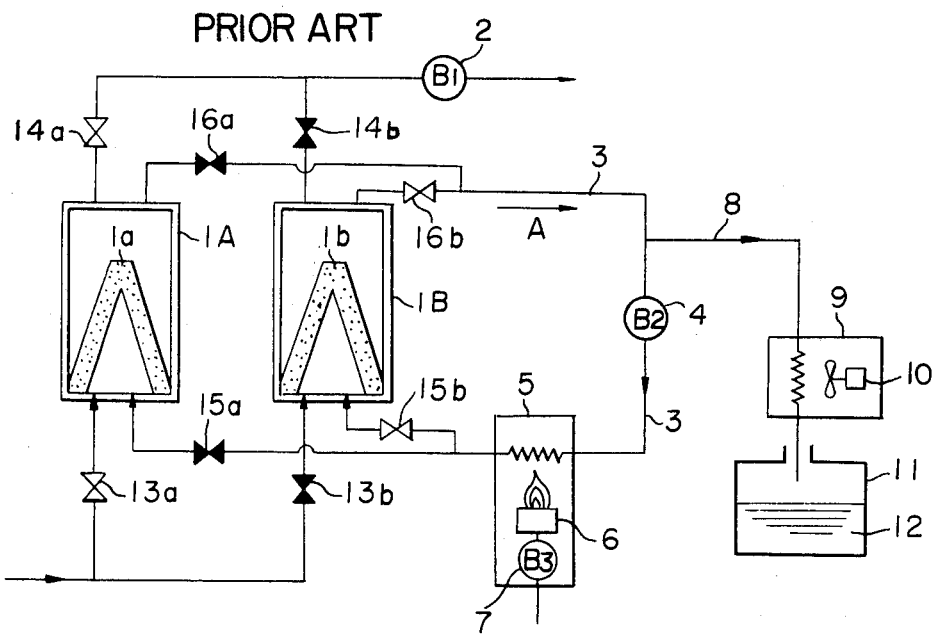
FIG. 1 is a diagram of one embodiment of the water producing apparatus in the prior art.

The operation of the embodiment of the water producing apparatus is substantially the same as that of the water producing apparatus in the prior art shown in FIG. 1.

In the following description, the first column (1A) is in the adsorbing step and the second column (1B) is in the desorbing step.

In the adsorbing step in the first colulmn (1A), the inlet door (13a) and the outlet door (14a) of the first column (1A) are respectively opened. The inlet door (13b) and the outlet door (14b) of the second column (1B) are closed. The directional control valve (19) is controlled so as to connect the passage (8b) to the condenser (9). The blower (2) is operated to suck air into the first column (1A) to contact the air with the adsorbent layer (1a) held in the first column to operate the adsorbing step.

On the other hand, when the first column (1A) is in the adsorbing step, the second column (1B) is in the desorbing step. In the desorbing step in the second column (1B), the blower for recycling (4a) is driven to recycle the hot air in the heating chamber (3b) heated by the heater (5b), through the recycling passage formed by the second column (1B) and the heating chamber (3b). The adsorbent layer (1b) in the second column (1B) is heated by the hot air to desorb the adsorbed water from the adsorbent layer (1b) as steam. Thus, the steam desorbed from the adsorbent layer (1b) is passed through the passage connected to the recycling passage formed by the second column (1B) and the heating chamber (3b) and the directional control valve (19), and passed to the condenser (9) which is cooled with air sucked from the first column (1A) into the discharge chamber (18) by the blower (2) whereby the steam is condensed into the liquid water and the water is stored in the water receiver (11) as those of the water producing apparatus in the prior art shown in FIG. 1.

The adsorbing step and the desorbing step are alternately carried out in the first and second columns (1A), (1B) whereby the liquid water can be continuously obtained.

In such embodiment of the water producing apparatus, the pipes and the valves for the gas passages used in the water producing apparatus in the prior art shown in FIG. 1, are not substantially used. Therefore, the operation is simple and the structure can be compact and transferable. The pressure loss caused by said pipes and the valves can be minimized and the blower (10) for cooling the condenser (9) shown in FIG. 1 can be eliminated to save the energy.

Figure 5:
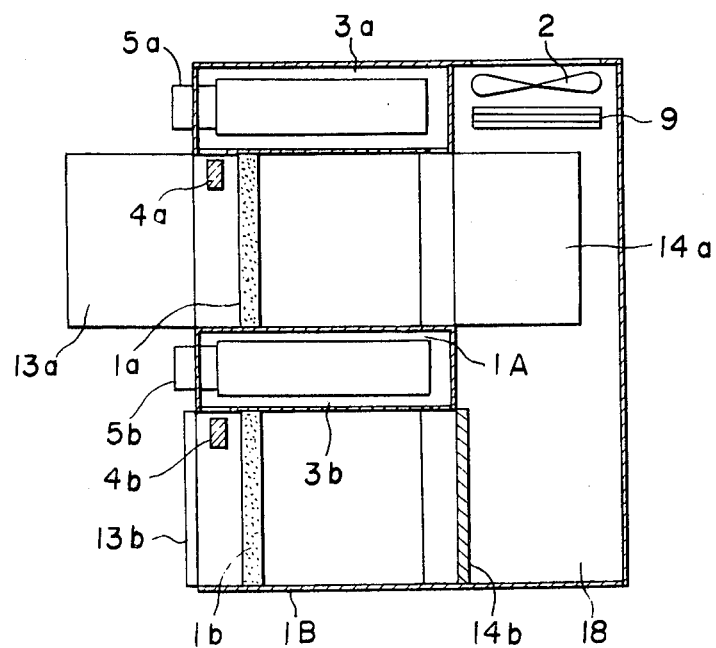
FIG. 5 is a sectional view of another embodiment of the water producing apparatus of the present invention.

FIG. 5 is a schematic sectional view of the second embodiment of the water producing apparatus of the present invention.

The second embodiment of the water producing apparatus has the structure substantially the same as that of the first embodiment shown in FIG. 2 except the first column (1A) and the second column (1B) are superposed as the upper and lower columns. The operation is substantially the same as that of the first embodiment. Therefore, the effect is substantially the same as that of the first embodiment.

The first and second embodiments show certain examples of the present invention and can be modified in the scope of the present invention.

For example (A) the heating chambers (3a), (3b) can be placed on a side plate other than the upper side plates of the first and second column (1A), (1B); (B) the blower (2) is changed to a compression type blower; (C) the inlet doors (13a), (13b) and the outlet doors (14a), (14b) are changed to sliding doors; (D) the positions of the blower (2) and the condenser (9) are exchanged; (E) the outlet for discharging air from the discharging chamber (18) is formed on the side plate; (F) the air inlet or the air outlet of the first and the second columns (1A), (1B) are formed on the side plates; (G) the adsorbent layers (1a), (1b) are respectively formed in the cylindrical shape. These modification can be made without any trouble.

In the first and second embodiments, the sectional configuration is the rectangular sectional configuration in the first column (1A) and the second column (1B). It is not always to be rectangular sectional configuration and can be the other sectional configuration. The sectional configuration of the connection between the first and second columns (1A), (1B) as the discharging chamber (18) in which the blower (2) and the condenser (9) are held, need not to be the same as that of the first and second columns (1A), (1B). The connection need not to be formed in one body.

The adsorbent used for the adsorbent layers (1a), (1b) used in the first and second embodiments can be zeolite such as molecular sieve 3A, 4A, 5A, 10 X and 13 X; silica gel, alumina gel, silica alumina, activated alumina, activated carbon, activated bauxite and activated clay which are usually used as a solid adsorbent. The adsorbent used as an aqueous solution such as lithium bromide, lithium chloride can be used by supporting it on a desired carrier such as alumina and asbestos. The form of the carrier can be grain, bead, pellet and tablet. It can be also a parallel passage layer using honeycomb carrier. The adsorbent can be selected depending upon the temperature and humidity. The condition for the adsorbing and desorbing operation of the adsorbent is selected depending upon the kind of the adsorbent and is not critical. In the first and second embodiments, the water receiver (11) is the open type, but it can be a closed type or an open type which is changed to a closed type after substituting air in the recycling passage with the desorbed steam, or the other modification. Any form can be used in the present invention. In the first and second embodiments, two columns as the first and second columns (1A), (1B) are employed. It is not always necessary to use only two columns and more than two columns can be used in the present invention.

In the description, the moisture in the ambient air is used for producing liquid water. Thus, the other source can be used without limiting to the ambient air.

The other modifications or preferable embodiments of the present invention will be illustrated.

FIGS. 6 to 11 show the embodiments which have the form capable of transferring by a container trailer (the capacity is limited) in the non-operation time and have high water producing ability.

In the non-operation time of the apparatus, the blower for adsorption and the condenser can be held in the discharge chamber. In the operation time, the blower and the condenser can be taken out from the chamber. The volume of the apparatus is minimized in the non-operation time.

Figure 6:
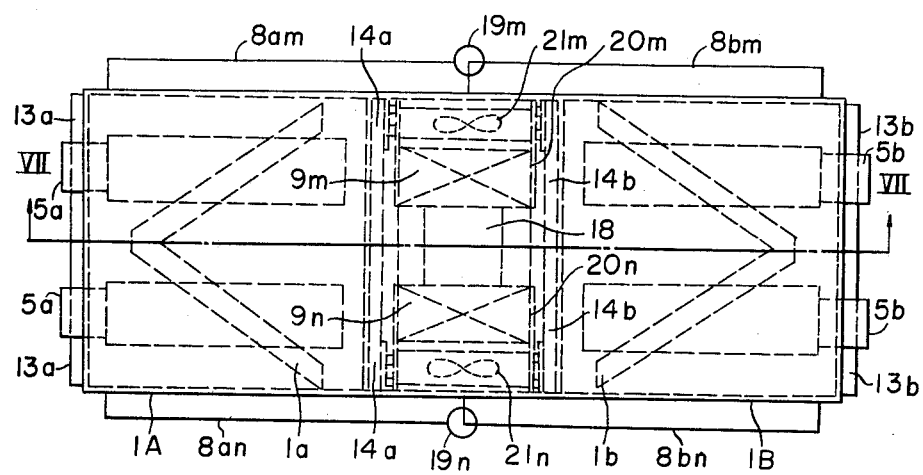
Figure 7:
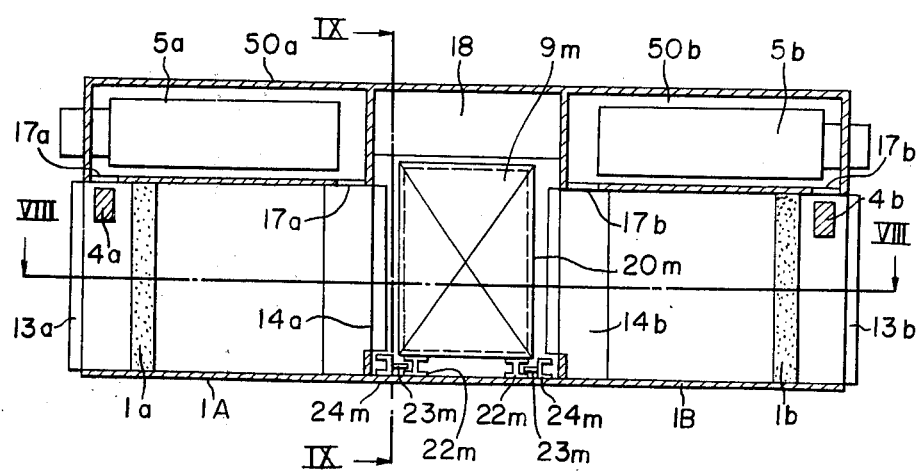
Figure 8:
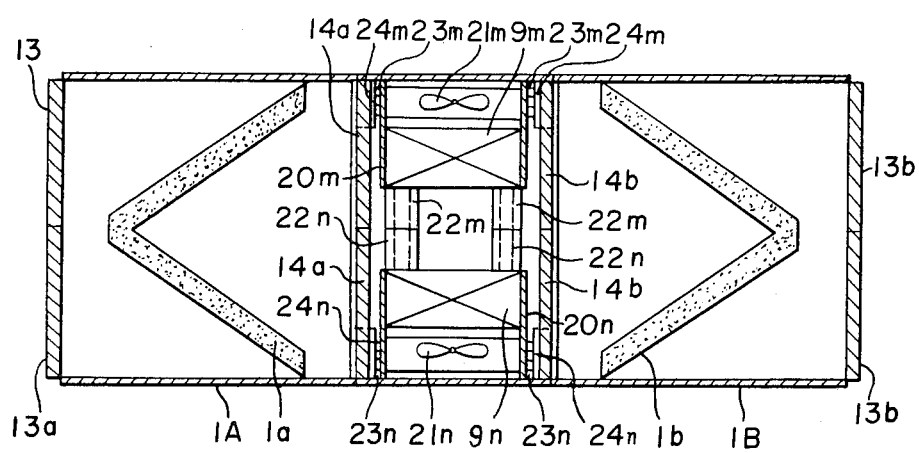
Figure 9:
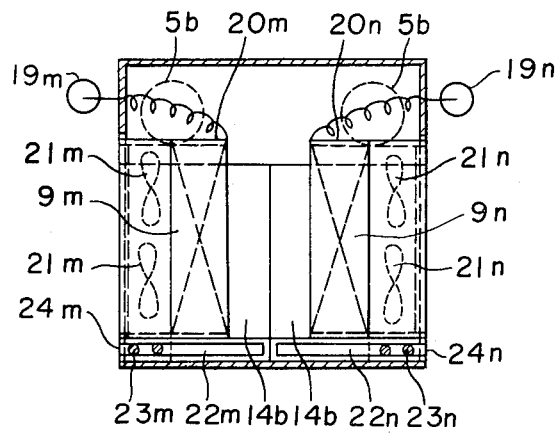
Figure 10:
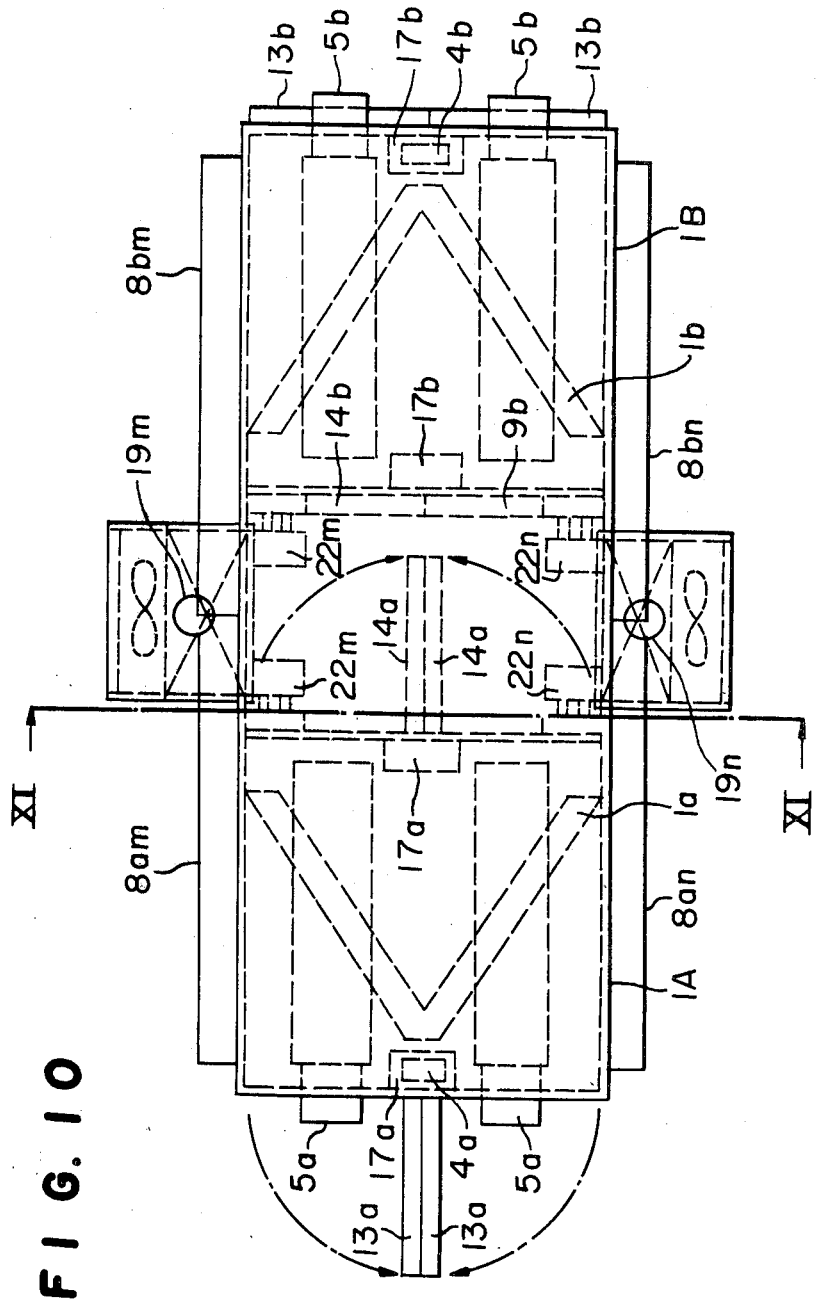
Figure 11:
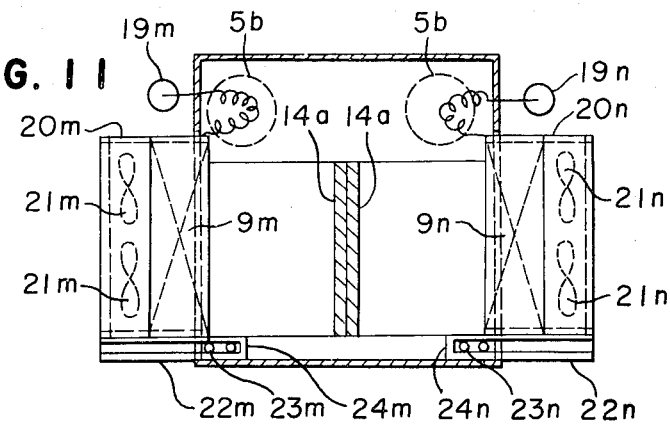

FIG. 6 is a schematic plan view of the embodiment of the present invention in the non-operation time. FIG. 7 is a sectional view taken along the VII—VII line of FIG. 6; FIG. 8 is a sectional view taken along the VIII—VIII line of FIG. 7; FIG. 9 is a sectional view taken along the IX—IX line of FIG. 8; FIG. 10 is a schematic plan view of the embodiment in the operation; and FIG. 11 is a sectional view taken along the XI—XI line of FIG. 10. In the embodiment, two pairs of the blowers for adsorption and the condensers which can be taken out to both sides of the discharge chamber are equipped.

In Figures, the reference numeral (20m) designates a first cylindrical holder surrounding a blower for adsorption (21m) and a condenser (9m) to hold them and to taken out them from the side plate of the discharge chamber (18); (20n) designates a second holder surrounding a blower for adsorption (21n) and a condenser (9n) to hold them and to taken out them from the other side plate of the discharge chamber (18); (22m) designates a first guide rail placed on a bottom plate of the first holder (20m) to guide the first holder (20m); (22n) designates a second guide rail placed on the bottom plate of the second holder (20n) to guide the second holder (20n); (23m) and (23n) respectively rollers which are respectively fitted in the guide grooves of the first and second guide rails (22m), (22n) to easily move the first and second guide rails (22m), (22n); (24m) and (24n) respectively designate first and second roller receivers which are mounted on the bottom plate of the discharge chamber (18) to support the rollers (23m), (23n).

The inlet door (13a) and the outlet door (14a) respectively open and close the inlet and the outlet of the first column (1A) with each fulcrum for the central parts of the upper and lower side plates at the ports. The inlet door (13b) and the outlet door (14b) respectively open and close the inlet and the outlet of the second column (1B) with each fulcrum for the central parts of the upper and lower side plates at the ports. The passages (8am), (8bm) are respectively connected to the heating chamber (50a) of the first column (1A) and the heating chamber (50b) of the second column (1B) at each end and are respectively connected through the directional control valve (19m) to the condenser (9m) with a flexible pipe at the other end. The passages (8an), (8bn) are respectively connected to the heating chamber (50a) of the first column (1A) and the heating chamber (50b) of the second column (1B) at each end and are respectively connected through the direction control valve (19n) to the condenser (9n) with a flexible pipe at the other end.

In the embodiment of the water producing apparatus, in the non-operation time, the first cylindrical holder (20m) for holding the blower (21m) and the condenser (9m) and the second cylindrical holder (20n) for holding the blower (21n) and the condenser (9n) are held in the discharge chamber (18). In the operation time, the first and second holders (20ml), (20n) are taken out from the discharge chamber (18).

The operation in the operation time can be easily understood from the operation of the embodiment shown in FIGS. 2 to 4, and accordingly, the detail description is eliminated.

In the embodiment of the water producing apparatus, even though the size of the chamber (18) is smaller to increase the volumetric ratio of the blowers (21m), (21n) and the condensers (9m), (9n), the blowers (21m), (21n) and the condensers (9m), (9n) are taken out from the chamber (18) in the operation time. Therefore, a turbulent flow of the discharging air is not caused in the chamber (18) and a pressure loss is not increased to increase the water producing ability. In the non-operation time, the blowers (21m), (21n) and the condensers (9m), (9n) are held in the chamber (18). Therefore, the size of the apparatus can be small. The water producing ability is high though the apparatus can be transferable by a container trailer whose movable volume is limited.

In the embodiment, the first holder (20m) for holding the blower (21m) and the condenser (9m) and the second holder (20n) for holding the blower (21n) and the condenser (9n) are used. It is not always necessary both the first and second holders (20m), (20n) and it is possible to use only one of the first and second holders (20m), (20n). In the emobidment, the sectional configuration of the first and second columns (1A), (1B) is a rectangular sectional configuration however it can be the other sectional configuration.

Figure 12:
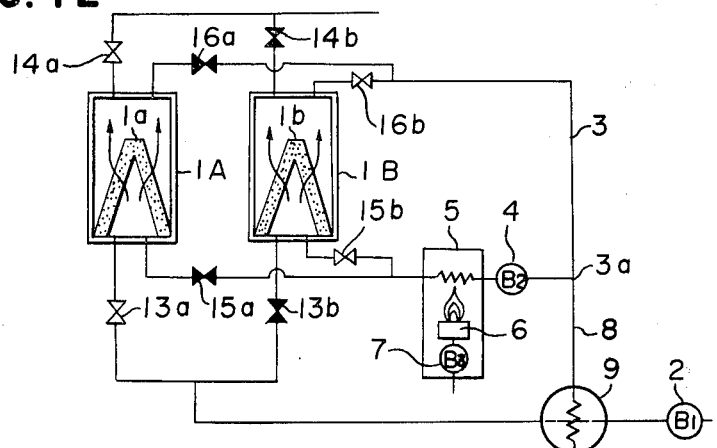

FIG. 12 shows the other embodiment wherein the condenser (9) is cooled by a part or whole of air fed to the column (1A) in the adsorbing step or a part or whole of air discharged from the column in the adsorbing step. In the embodiment, the cooling means for cooling the condenser (9) can be eliminated. The apparatus can be compact and the saving of energy is attained.

Figure 13:
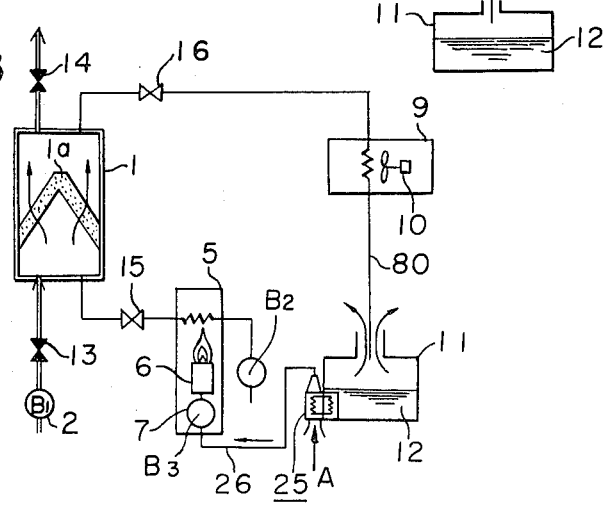

FIG. 13 shows the other embodiment wherein a heat-exchanger is placed in the water receiver to heat-exchange of the hot water in the water receiver with the air for combustion fed into the burner for the heater, whereby the hot water is cooled and the air for combustion is heated to improve the combustion.

In FIG. 13, the heat-exchanger (25) is placed in the water receiver (11). The ambient air is fed outside of the heat-exchanger (25) as shown by the arrow line A thereby heat-exchanging it with the hot water (12) to obtain the air for combustion, which is sucked through the passage (26) into the blower for heating (7).

Figure 14:
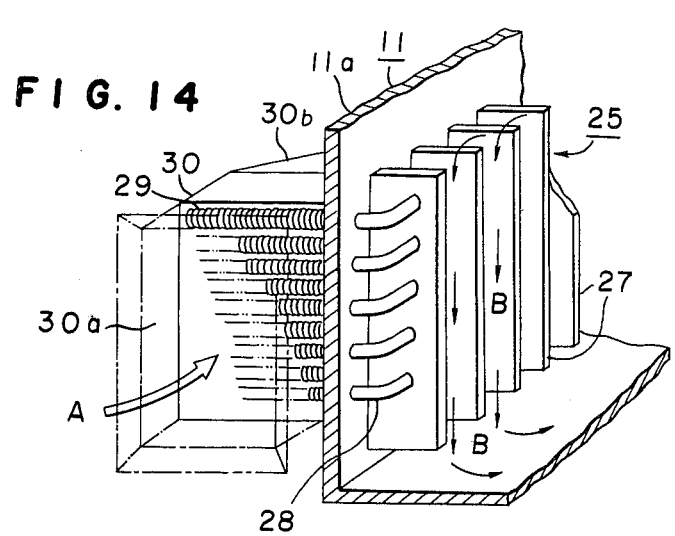
Figure 15:
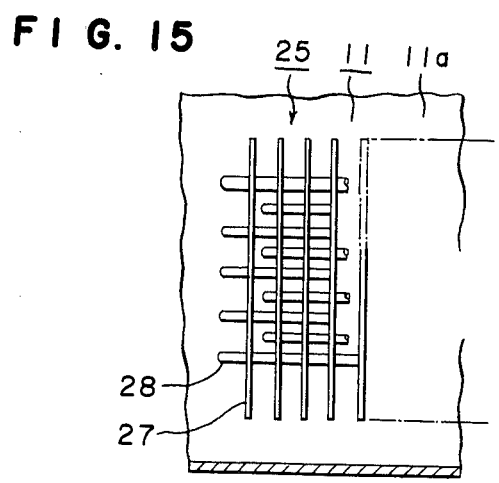

The important parts of the heat-exchanger (25) are shown by the schematic view and side view in FIGS. 14 and 15.

The heat-exchanger (25) has the following structure. A plurality of fins (27) are formed on an inner wall of a side plate (11a) of the water receiver (11). Many heat pipes (28) are brought into contact with the fins (27) at one ends and are projected through the side plate (11) at the other ends. Ribbon type fins (29) are formed on the other ends in high density. An outer casing (30) surrounds the outer parts of the heat pipe (28) at the other ends to feed the ambient air from the inlet (30a) to the arrow direction and the outlet (30b) is connected to the passage (26). The fins (27) are dipped into the hot water in the water receiver (11).

The operation of the embodiment will be illustrated.

The air for combustion to the burner (7) is fed by the blower (6) so as to feed the ambient air into the outer casing (30) of the heat-exchanger (25) to the arrow direction A, whereby the other ends of the heat pipes (28) are cooled and the one ends having the fins (27) of the heat pipes (28) are heated with the hot water (12) to transfer heat at high efficiency from the higher temperature side to the lower temperature side, the air for combustion fed to the burner (6) is preheated to improve the combustion efficiency and to save the cost. When the temperature of the fins (27) placed on the side plate (11a) of the water receiver (11) is lowered by the heat-transfer of the heat pipes (28), the temperature of the hot water (12) contacting with the fins is lowered and the density of the water is increased and the water is flowed downwardly along the fins (27) to the arrow direction B.

A radiated heat Q from the inside of the water receiver (11) of the heat-exchanger (25) to the atmosphere for cooling the hot water (12) in the water receiver (11) is given by the equation:

$$Q = U(\theta_w - \overline{\theta}_a)$$

wherein $1/U = 1/\alpha_i A_i + 1/\alpha_a A_a$;

$\alpha_i$: heat transmissiblity between the water (12) and the fins (27);

$A_i$: heat exchange area of the fins (27);

$\theta_{wf}$: temperature of the surface of the fins (27);

$\theta_w$: temperature of water;

$\overline{\theta}_a$: average temperature of air at the air inlet (30a) and the air outlet (30b) of the outer casing (30);

$\overline{\theta}_{af}$: average temperature of the fins (29);

$\alpha_a$: heat transmissibility between the average temperatures $\overline{\theta}_a$ and $\overline{\theta}_{af}$;

$A_a$: heat-exchange area of the fins (29); and

U: heat transferring coefficiency.

According to the equation, it is clarified that the radiated heat Q can be increased by lowering the temperature of water in the water receiver (11). It is necessary to increase the capacity of the blower (7) and the heat-exchange areas $A_i$, $A_a$. It is also necessary to decrease relatively the values of $1/\alpha_i A_i$ and $1/\alpha_a A_a$. The heat-exchange area $A_i$ can be increased by mounting fins (27) on the side plate (11a) in the water receiver (11). The heat transmissibility is in a range of about 100 to 300 (the heat resistance of the surface of the side plate (11) can not be neglected without the heat pipes (28)). At the atmosphere, the area can be several times by forming the fins (29) for forcible air flow in comparison with the effect of the fins (27). (The effect of the fins can be increased for several times by the heat pipes (28)). Therefore, the value of $1/\alpha_a A_a$ can be decreased even though the heat transmissibility $\alpha_a$ is about 10 to 30.

Figure 16:
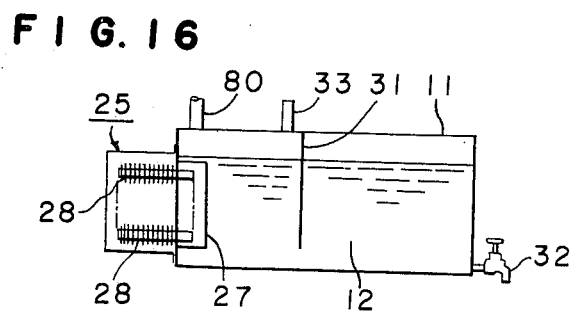

FIG. 16 shows a modification of the embodiment of FIG. 14 and is a schematic sectional front view of a water receiver equipped with the heat-exchanger. In the water receiver (11), a partition (31) is placed whereby the hot water fed through the passage (80) is heat-exchanged in the chamber for the heat-exchanger (25) and the cooled water at the bottom is flowed into the chamber for the outlet (32). Therefore, the hot water in the chamber for the heat-exchanger is cooled at high efficiency. An air vent pipe (33) is used.

In this embodiment, the heat pipe (28) is connected to the heat-exchanger (25). It is possible to eliminate the heat pipe and to form a plurality of the heat radiation pipes for cooling by flowing water in the water receiver (11) from the upper part to the lower part on the outer side of the side plate (11a). When the cooling fins are formed on the heat radiation pipes, the cooling effect can be improved.

It is also possible to eliminate the heat pipes (28) but to form many fins on both surfaces of the side plate of the water receiver and to surround the outer fins by a casing and to feed air from the lower side into the casing and to feed the heated air in the heat-exchange from the upper side into the passage (26). In this embodiment, the fins (29) are formed at the other ends of the heat pipes (28). The fins can be eliminated, if desired.

FIGS. 17 and 18 are respectively a side view and a front view of the embodiment placing the water producing apparatus on a car. The water producing apparatus comprises a plurality of ducts projected through the water receiver in vertical direction whereby the ambient air is fed upwardly into the ducts so as to cool the hot water in the water receiver without a driving power.

In FIGS. 17 and 18, the reference numeral (34) designates a trailer type car comprising a driving car (34a) and a truck (34b); (35) designates a base; (36) designates a water producing apparatus placed on the base. The outer structure of the water receiver (11) is the same as that of the above embodiment. The water receiver (11) is fixed on the base (35) through the legs (36) to form a gap for passing air between the bottom plate and the base and an air inlet (37) is formed. The reference numeral (38) designates a plurality of ducts projected in the water receiver (11) in the vertical direction; (39) designates an air outlet for discharging a cool air through the ducts; (80) designates a passage for feeding water and air formed in the condenser (9) and the passage is connected to the water receiver (11); (40) designates an outlet pipe for discharging the air fed through the passage (80) to the water receiver (11) into the atmosphere; (41) designates wire nets for covering the outer parts of the air inlet (37) and the air outlet (39).

The water receiver (11) shown in FIG. 19 as a schematic view comprises the bottom plate (11a), the upper plate (11b), the side plates (11c), (11d) in a box form. The air ducts (38) are projected through the bottom plate (11a) and the upper plate (11b) in the vertical direction and formed as the air pipes (42) bonded on the plates.

The operation of the water receiver (11) will be illustrated. When hot water is fed through the passage (80) into the water receiver (11), the air in the air ducts (38) is heated through the air pipes (41) and is upwardly moved by lowering the density of the air to discharge through the air outlet (39). In such manner, the cooled air is fed from the air inlets (37) and moves upwardly through the air ducts (38) by the natural flow whereby the hot water in the water receiver (11) is cooled by the heat-exchange. The gap between the base (35) and the bottom plate (11a) of the water receiver (11) can be about 50 to 100 mm for the air flow.

In said embodiment, a table is formed on the base (35), whereas the base (35) can be formed by frames so as to flow air from the bottom in the vertical direction. In such case, the wire net is placed at the bottom. When the water producing apparatus is placed on the trailer, the hot water can be effectively cooled during the driving.

The capacity of the water receiver can be to store about 1 to 25 tons and accordingly, the height can be only several tens cm. Therefore, the other parts of the water producing apparatus beside the water receiver can be held by legs (36) on the water receiver.

In said embodiment, the air pipes (42) are in a circular sectional cylindrical form but can be in the other forms such as polygonal, elliptic, oblatic and flat sectional cylindrical form.

In said embodiment, the water receiver (11) is horizontally placed but can be vertically or slantly placed so as to have a small width but a large height whereby a length of the ducts is longer. When the fins for cooling which are projected on the side surfaces of the vertical or slant water receiver are formed, the cooling efficiency is further improved.

In said embodiment, the water producing apparatus is placed on the car. It is also possible to place on another truck such as a truck on the rail or to place on the ground.

FIG. 20 is a schematic view of a partially broken front view of one embodiment of a water producing apparatus and the auxiliary display system to detect the condition for adsorbing water in the adsorbent layer depending upon the weight of the adsorbent layer.

In FIG. 20, the reference numeral (101) designates an gas inlet formed on the column (1) to pass the gas through the adsorbent layer (1a); (102) designates balls for decreasing friction between the side surface of the adsorbent layer (1a) and the inner wall of the column (1); (103) designates a load cell for measuring the weight of the adsorbent layer (1a) which is inserted between the bottom of the adsorbent layer (1a) and the inner bottom of the column (1); (104) designates a weight limit detecting circuit which comprises an amplifier (105) for amplifying the output of the load cell (103); a discriminator (106) for discriminating whether the output of the amplifier reaches to the predetermined value or not; a first display circuit of a serial connection of a relay (107), a lamp (108) and a power source (109); and a second display circuit of a serial connection of a relay (110), a lamp (111) and a power source (112).

In the adsorbing step and the desorbing step, the size of the gas inlet (101) of the column (1) is smaller than the facing surface of the adsorbent layer (1a) so as to prevent the discharge of a part of the gas sucked in the column (1), without passing through the adsorbent layer (1a) which causes lowering of the adsorbing efficiency and the desorbing efficiency.

The operation will be illustrated in detail.

Just before the adsorbing step or at the completion of the desorbing step, a content of water adsorbed in the adsorbing layer (1a) is small and the dead weight of the adsorbent layer (1a) and the weight of small water are applied to the load cell (103). In order to apply the weights precisely to the load cell (103), balls (102) are placed between the inner wall of the column (1) and the side surface of the adsorbent layer (1a) to eliminate the friction. In such condition, the discriminator (106) detects the fact that the electric output of the amplifer (105) connected to the load cell (103) reaches to the first predetermined value corresponding to the specific weight for the lower limit of the water. At this moment, the relay (107) is actuated to form a closed circuit for the first display circuit to display the just before adsorbing step or the completion of the desorbing step by turning on the lamp (108). The second display circuit is an open circuit.

When the adsorbing step of the adsorbent layer (1a) (after completing the desorbing step) is started to increase the water content adsorbed in the adsorbent layer (1a), the weight of the adsorbent layer (1a) is increased and the discriminator (106) detects the fact that the electric output of the amplifier (105) is in the range between the first predetermined value and the second predetermined value for the completion of the adsorbing step whereby the relay (107) is stopped to form the open circuit for the first display circuit. The adsorbed water content is increased to reach the weight of the water and the adsorbent layer (1a) enough to start the desorbing step, the discriminator (106) detects the fact that the electric output of the amplifer (105) reaches to the second predetermined value. The relay (110) is actuated and the second display circuit forms the closed circuit to display the completion of the adsorbing step by turning on the lamp (111). Thus, the optimum time for switching the operation from the adsorbing step to the desorbing step or from the desorbing step to the adsorbing step is detected whereby the water producing efficiency can be increased.

It is also possible to modify a part of the embodiment so as to automatically switch from the adsorbing step to the desorbing step and from the desorbing step to the adsorbing step by an electric signal of the weight limit detecting circuit.

In said embodiment, the load cell for applying the compression force depending upon the increase of the weight of the adsorbent layer is placed. Thus, a load cell can be placed at a position for applying a tensile force depending upon the increase of the weight of the adsorbent layer.

It is also possible to detect a water content adsorbed in the adsorbent layer in the middle stage of the adsorbing or desorbing step by varying the predetermined limit for detecting by the discriminator.

Figure 21:
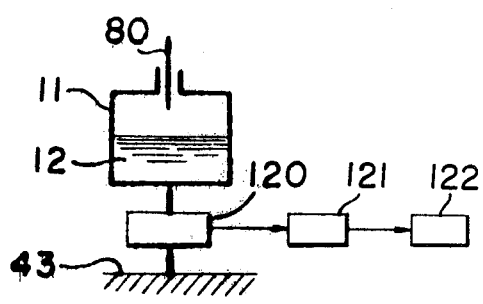

FIG. 21 shows a water producing apparatus which detects the water stored in the water receiver by a load meter for measuring the total weight of the water receiver and the water stored in it.

In FIG. 21, the reference numeral (43) designates fixing parts for mounting the water receiver (11); (120) designates a load meter for measuring the total weight of the water receiver (11) and the water (12) stored in it which is placed between the water receiver (11) and the fixed parts (43). The load meter (120) comprises a gauge and a piezoelectric device to output an electric signal proportional to the loaded weight.

The electric signal is referred to as a load signal. A load signal amplifier (121) is to connect to the load meter to amplify the load signal output by the load meter (120) and a load signal detector (122) is such as a voltage meter and is connected to the load signal amplifier part (121) to detect the load signal amplified by the load signal amplifier (121).

In said embodiment of the water producing apparatus, the load meter (120) is placed between the water receiver (11) and the fixed parts (43) whereby the total weight of the water receiver (11) and the water (12) stored in it can be measured by detecting the load signal output from the load meter (120) through the load signal amplifier (121) by the load signal detecting part (122). Therefore, when only the weight of the water receiver (11) is measured, the weight of the water (12) stored in the water receiver (11) can be easily measured.

In said embodiment of the water producing apparatus, the weight of the water (12) stored in the water receiver (11) can be easily measured, the water producing velocity as the weight of the water (12) stored in the water receiver per a unit time can be calculated. Therefore, the performance of desorbing step for desorbing the adsorbed water from the adsorbent layer (1a) can be easily found.

It can also found the fact whether the water receiver (11) can store further water (12) i.e. whether it is full or not.

The load signal detecting part (122) need not to place near the water receiver (11), and can be placed at a distant place to monitor the weight of the water in the water receiver (11).

FIGS. 22 to 25 show schematic views of important parts in modifications of the water producing apparatus of FIG. 21.

Figure 22:
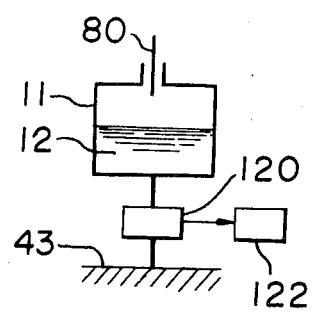

In the embodiment shown in FIG. 22, the load signal amplifier (121) used in that of FIG. 21 is eliminated, because a large load signal is given by a load meter (120) using a piezoelectric device.

Figure 23:
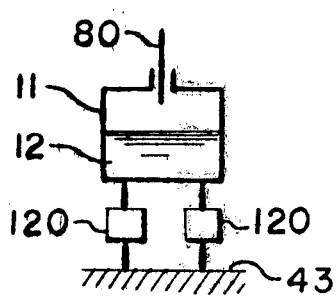

In the embodiment shown in FIG. 23, a plurality of the load meters (120) are placed between the water receiver (11) and the fixed parts (43).

Figure 24:
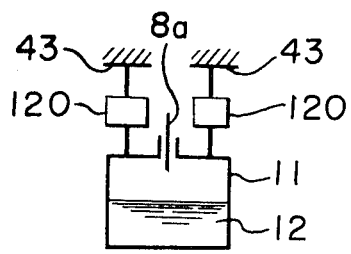

In the embodiment shown in FIG. 24, the water receiver (11) is suspended through the load meter (120) from the fixed parts (43).

Figure 25:
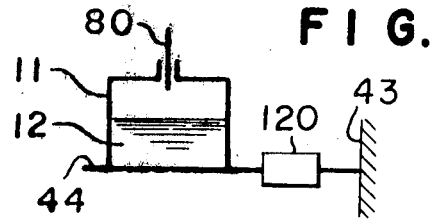

In the embodiment shown in FIG. 25, the water receiver (11) is placed on beams (44) which are horizontally connected to the vertical fixed parts (43) and which have the load meter (120) which is a strain gauge etc. equipped on the beam (44) so as to measure a bending moment given to the beam (44) corresponding to the total weight of the water receiver (11) and the water (12) stored in it.

It is clear that the embodiments shown in FIGS. 22 to 25 have the same effect as that of the embodiment shown in FIG. 21.

Figure 26:
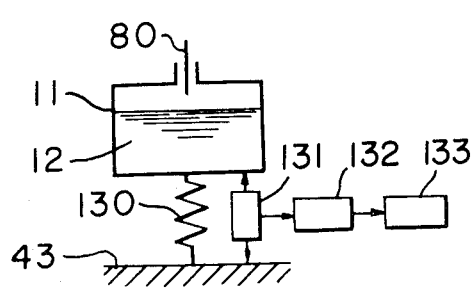

FIG. 26 is a schematic view of the important part of the water producing apparatus wherein a spring is placed between the water receiver and the fixed parts thereof so as to displace depending upon the total weight of the water receiver and the water stored in it and a displacement meter for measuring the displaced distance so as to detect the weight of the water stored in the water receiver. The other parts of this embodiment are the same as those of the embodiment shown in FIG. 1.

In FIG. 26, the reference numeral (130) designates a spring which is displaced depending upon the total weight of the water receiver (11) and the water (12) stored in it and the spring is placed between the water receiver (11) and the fixed parts (43). The reference numeral (131) designates a displacement meter which outputs a displacement signal proportional to displacement of the water receiver (11). The displacement meter is made of a sliding resistor and a differential transformer. The reference numeral (132) designates a displacement signal amplifier which amplifers a displacement signal from the displacement meter (131); (133) designates a displacement signal detector which is connected to the displacement signal amplifier (132) to detect the displacement signal amplified by the displacement signal amplifier (132) made of a voltage meter etc.

In the embodiment of the water producing apparatus, the spring (130) is placed between the water receiver (11) and the fixed parts (43) whereby the water receiver (11) is displaced depending upon the total weight of the water recevier (11) and the water (12) stored in it. The displacing signal corresponding to the displacement is output from the displacement meter (131) through the displacement signal amplifying part (132). When the out displacement signal is detected by the displacement signal detecting part (133), the total weight can be measured. Therefore, when only the weight of the water receiver (11) is measured, the weight of the water (12) stored in the water receiver (11) can be easily measured from the total weight.

The displacement signal detector (133) need not be placed near the water receiver (11) and accordingly, it can be placed at the place departed from the water receiver (11) to moinitor the weight of the water (12) stored in the water receiver (11) from a distant place.

FIGS. 27 to 31 respectively show schematic views of the important parts in modifications of the embodiment shown in FIG. 26.

Figure 27:
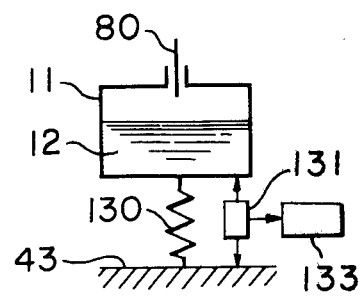

In the embodiment shown in FIG. 27, the displacement signal amplifier (132) in the embodiment of FIG. 26 is eliminated because a large displacement signal can be given by the displacement meter (131) made of a sliding resistor.

Figure 28:
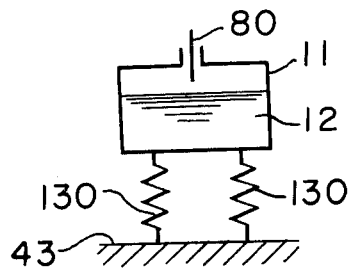

In the embodiment shown in FIG. 28, a plurality of springs (130) are placed between the water receiver (11) and the fixed parts (43).

Figure 29:
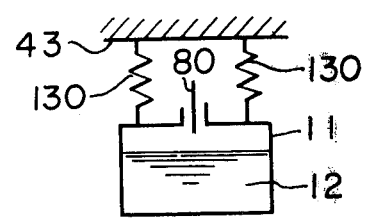

In the embodiment shown in FIG. 29, the water receiver (11) is suspended through the springs on the fixed parts (43).

In the embodiment shown in FIG. 30, the first and second fixed parts (43a), (43b) are formed above and below the water receiver (11) to place springs (130) between the water receiver (11) and the upper and lower fixed parts (43a), (43b).

Figure 30:
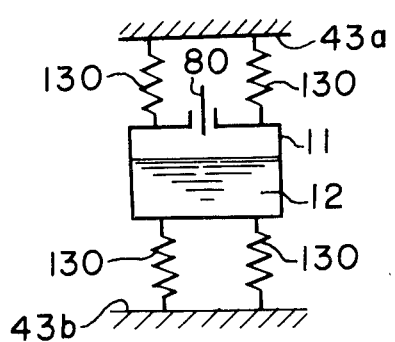

In FIGS. 28 to 30, the displacement meter is not shown.

Figure 31:
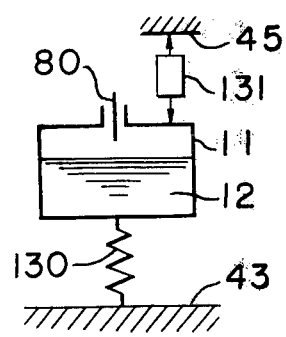

In the embodiment shown in FIG. 31, the fixed part is placed above the water receiver (11) and the displacement meter (131) is placed between the fixed part (45) and the water receiver (11) in the embodiment of FIG. 26.

In the embodiments shown in FIG. 27 to 31, the same effect of the embodiment shown in FIG. 26 is imparted.

The displacement meter (131) which converts the displacement of the water receiver (11) into the electric signal has been used. The present invention is not critical to use the displacement meter. The meter can be the other meter for converting the displacement into the angle as a dial gauge or a meter for converting the displacement into a pressure as an air micrometer.

FIG. 32 shows a sectional view of the important part and a schematic view of a display system of one embodiment of the water producing apparatus having high efficiency wherein a pressure difference between the gas inlet and the gas outlet of the column having the adsorbent layer is detected by a mechanism using a closed bellows so as to find a clogging of the adsorbent layer and this can be treated immediately.

In FIG. 32, the arrow line shows the gas flow in the column (1) and the reference numerals (141) and (142) designate bellows; (143) and (144) designate respectively end plates sealed on each end of the bellows (141), (142) and are connected to the outer wall of the column (1); (145) designates a partition which is sealed on each other end of the bellows (141), (142) to separate the bellows; (146) designate a pipe which is connected to the end plate (143) so as to connect the inside of the bellows (141) and the gas inlet of the column (1); (147) designates a pipe which is connected to the end plate (144) so as to connect the inside of the bellows (142) and the gas outlet of the column (1); (148) designates a movable contact mounted on the partition (145); (149) designates a stationary contact facing to the contact (148); (150) designates a lamp; (151) designates a power source; (152) designates a display circuit formed by serially connecting the contacts (148), (149), the lamp (150) and the power source (151). The movable contact (148) and the stationary contact (149) are opened when the inner pressures of the bellows (141), (142) is balanced. When the inner pressure in the bellows (141) is increased to higher than the predetermined value, they are closed.

In the embodiment, during the normal operation, the pressure loss between the gas inlet and the gas outlet through the adsorbent layer (1a) in the column (1) is only small and constant. Therefore, the partition (145) between the bellows (141), (142) is substantially in the balanced position. The movable contact (148) and the stationary contact (149) are opened, whereby the lamp (150) is not operated to display the normal operation.

When a clogging of the adsrobent layer (1a) is caused, the pressure loss between the gas inlet and the gas outlet through the adsorbent layer (1a) in the column (1) is increased. The degree of the increase of the pressure loss is quadratically increased depending upon the degree of the clogging. The pressure in the gas inlet is applied through the pipe (146) to the first bellows (141) and the pressure in the gas outlet is applied through the pipe (147) to the second bellows (142), whereby the partition (145) is shifted and the movable contact (148) approaches to the stationary contact (149). When the degree of the clogging reaches to the predetermined value, the contacts (148), (149) are brought into contact to close the display circuit (152) to turn on the lamp (150) and to display the fact of the clogging, for the predetermined degree. The treatment for eliminating the clogging of the adsorbent layer (1a) is carried out depending upon the display. The decrease of the efficiency of the water producing apparatus is prevented by the treatment.

In said embodiment, the display is carried out by the lamp. It is possible to automatically stop the operation of the water producing apparatus or to automatically start an automatic elimination of the clogging of the adsorbent layer by utilizing the closing of the contacts. The position of the stationary contact can be set as desired and the degree of the clogging of the adsorbent layer can be detected.

FIG. 33 is a side view of the inner part of the column in the water producing apparatus wherein the adsorbent layer is rotated to alternately exchange the gas inlet surface and the gas outlet surface of the adsorbent layer whereby the clogging of the adsorbent layer is prevented.

In the system for reversing the gas flow in the pipe connected to the column by controlling the valves, it is not easy to use a pipe having large diameter. The gas flow rate is limited depending upon the diameter of the pipe. In this embodiment, the adsorbent layer is rotated to alternately exchange the gas inlet surface and the gas outlet surface of the adsorbent layer.

In FIG. 33, the same reference numerals designate identical or corresponding parts shown in FIG. 1. In said embodiment, a plurality of the adsorbent layers (161), (162), ... (169), (170) which are arranged in superposed state in the column (1). The reference (171) designates a central pin for holding the center of the adsorbent layers (161), (162), ... (169), (170) so as to allow the rotation around the center line perpendicular to the air flow in parallel to the main surfaces of the adsorbent layers; (172a) designates a link for linking one end of the adsorbent layers (161) ... (169) in odd numbers; (172b) designates a link for linking one end of the adsorbent layers (162) ... (170) in even numbers at the reverse side to that of the link (172a); (173a) designates a pin for holding rotatably the adsorbent layers (161) ... (169) in odd numbers on the link (172a); (173b) designates a pin for holding rotatably the adsorbent layers (162) ... (170) in even numbers on the link (172b); (174) designates an operating hand for shifting the line (172a) and the link (172b) to the longitudinal direction from the outer part of the column (1) and the broken arrow line shows the air flow direction.

FIGS. 34A and 34B are respectively partially enlarged side views of the inside of the column for illustrating the operation of the embodiment.

The reference numerals (161a), (162a), (163a), (164a) respectively designate ends of the adsorbent layers (161), (162), (163), (164) at the side of the link (172a); and (161b), (162b), (163b), (164b) respectively designate ends of the adsorbent layers (161), (162), (163), (164) at the side of the link (172b).

The embodiment for the adsorbent layers (161)–(164) will be illustrated. In the conditon shown in FIG. 34A, the end (161a) contacts with the inner wall of the column (1); and the end (161b) and the end (162b); the end (162a) and the end (163a); and the end (163b) and the end (164b) respectively brought into contact each other. The air is flowed to the broken arrow line direction. The moisture in the air is adsorbed on the adsorbent layer (161)–(164). When this condition continues for a long time, dusts and sands are deposited on the air inlet surfaces of the adsorbent layers (161), (162), (163), (164). Thus, the adsorbent layers (161), (163) are turned to the full arrow line direction C around the central pin (171) and the adsorbent layers (162), (164) are turned to the full arrow line direction D around the central pin (171) by pulling the operating handle (174) (not shown in FIGS. 34A and 34B). By the rotaion, the end (161b) contacts with the inner wall of the column (1) and the end (161a) and the end (162a); the end (162b) and the end (163b); and the end (163a) and the end (164a) are respectively brought into contact each other to be the condition shown in FIG. 34B. Air is fed to the reverse direction to the direction in FIG. 34A, through the adsorbent layers (161), (162), (163) (164). The air inlet surface is changed to the air outlet surface. The dusts and sands deposited on the surfaces of the adsorbent layers (161)–(164) are detached. In this condition, the moisture in air is adsorbed in the adsorbent layers (161)–(164). After the desired time, the condition is returned to that of FIG. 34A by pushing the operating handle (174). Therefore, the clogging can be prevented by the addition of the simple mechanism.

In said embodiment, a plurality of the adsorbent layers are held in the column. Thus, it is possible to apply this feature for the structure holding only one adsorbent layer in the column.

In the apparatus shown in FIG. 1, it is necessary to control the temperature so as to prevent over rise or fall of the temperature of the recycled gas for the desorption in the desorbing step. This causes pulsation of the temperature whereby the volume of steam in the column (1) and the recycling passage is fluctuated. In the desorbing step, the steam formed in the column (1) should be always moved toward the condenser (9). When the volume fluctuation of the steam is severe, the ambient air may be sucked through the passage (8c), the condenser (9) and the passage (8b) into the column (1) and the recycling passage (3a) or it is discharged as a breathing phenomenon. The sucked ambient air is mixed with the steam in the column (1) and the recycling passage (3a) whereby the mixture of the air and the steam is discharged. When air is mixed with the steam, the efficiency for converting the steam into liquid water in the condenser is lowered and some of the steam is passed through the condenser (9) with air to cause a decrease of the water production.

Even though the volume change is relatively small not to suck the ambient air, the condensing efficiency of steam is lowered in the condition of reciprocating the steam in the condenser (9) whereby the water production is decreased. In order to prevent the volume fluctuation, the precise temperature control is performed so as to prevent the pulsation of the temperature. This requires a high degree of control, to cause a requirement of an expensive apparatus.

The embodiment shown in FIG. 35 is to overcome the problem.

FIG. 35 is a diagram of one embodiment of the water producing apparatus having high water production efficiency wherein the breathing phenomenon is reduced by connecting a valve such as a water shield valve at the outlet of the condenser so as to overcome the disadvantages.

The body of the water producing apparatus is the same as that of FIG. 1 in the prior art, and therefore, it is not repeated.

In FIG. 35, the reference numeral (46) designates a U-shaped pipe water shield part; (46a) designates water stored in the U-shaped water shield part (46); (8d) designates a passage of the overflowed water into the water receiver (11).

Figures 36A, 36B, 36C:
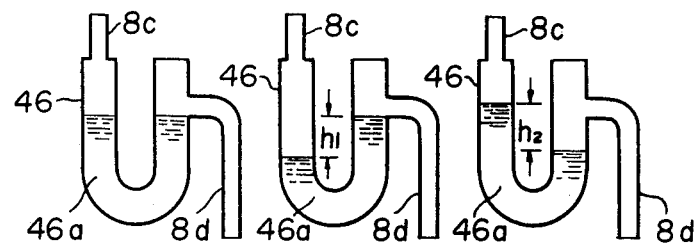

FIGS. 36A, B and C are respectively partially enlarged sectional view of the U-shaped water shield part for illustrating the operation.

The operation will be illustrated referring to FIGS. 35 and 36A, B and C.

Even though the temperature of the gas in the column (1) and the recycling passages (3), (3a) is varied, only the water level in the U-sahped water shield part (46) is varied as shown in FIG. 36B and 36C whereby the breathing phenomenon can be prevented. Even though the temperature is raised to expand the gas, the pressure is applied for the water level difference $h_1$ in the U-shaped water shield part (46) to prevent the expansion as shown in FIG. 36B.

For example, when the temperature is suddenly raised for 10° C. from the condition of 1 atm. at 300° C., if no volume is varied, the pressure rising, is proportional to the absolute temperature to give $$1 \times \left( \frac{273 + 310}{273 + 300} - 1 \right) \approx 0.018 \text{ (atm.)}$$

The pressure difference is balanced to $h_1 = 18$ cm (1 atm=1000 cm H$_2$O).

When the temperature is suddenly fallen for 10° C. from the condition of 1 atm of 300° C., the pressure drop is also given as $$1 \times \left( \frac{273 + 290}{273 + 300} - 1 \right) \approx -0.018 \text{ (atm.)}$$

As shown in FIG. 36C, the water level difference $h_2 = 18$ cm is given to balance the pressure. When the U-shaped water shield part (46) having a height of $h_1$ and $h_2$ for each 18 cm is used, the breathing phenomenon is not caused even though the temperature is suddenly varied in a range of ±10° C. and the decrease of the water production can be prevented. The height of the U-shaped water shield part (46) can be calculated by said manner for the expected temperature change.

If the height of the U-shaped water shield part (46) is too large, there is a possibility of breaking of the column (1) by an abnormal pressure rising or dropping. Therefore, the height of the U-shaped water shield part (46) should be minimized so as to be capable of discharging or sucking the air in the abnormal condition.

When the temperature is not changed, it is balanced for the water level difference of zero as shown in FIG. 36A. When the liquid water condensed in the condenser (9) is fed through the passage (8c), liquid water is overflowed to feed out through the passage (8d) into the water receiver (11). The condensed water is always passed through the U-shaped water shield part (46) and accordingly, water for the water shield (46a) is always kept in it. It is unnecessary to supply water.

Figure 37:
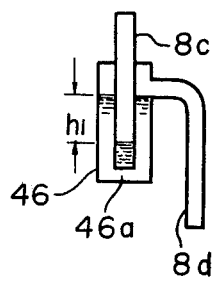

FIG. 37 is a sectional view of the other first embodiment of the water shield part wherein it has the same effect as that of the U-shaped pipe. FIG. 37 shows the condition for a water level difference of $h_1$ caused by the raising of the temperature.

Figure 38:
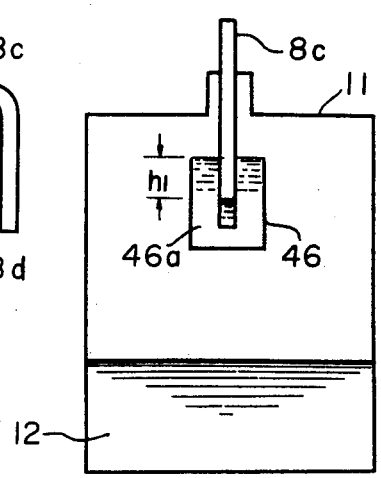

FIG. 38 is a sectional view of the other second embodiment of the water shield part wherein the water shield part (46) is formed at the end of the pipe inserted into the water receiver (11) and it has the same effect as that of FIG. 37.

Figure 39:
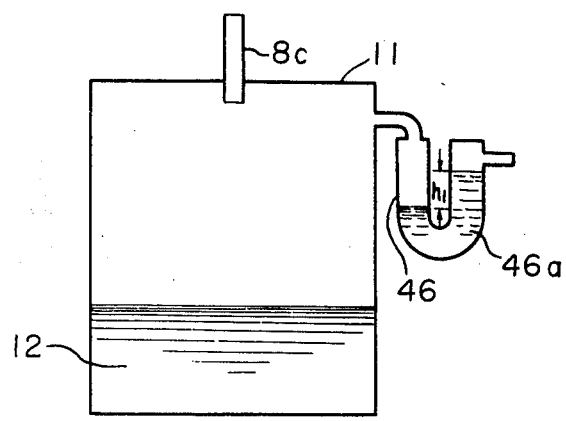

FIG. 39 is a sectional view of the other third embodiment of the water shield part wherein the U-shaped water shield part (46) is connected between the water receiver (11) and the atmosphere. The gas phase at the upper part of the water receiver (11) impart cushion effect against the expansion and contraction of the gas in the column (1) and accordingly a slight breathing phenomenon is caused and water should be supplied in the U-shaped water shield part (46).

The same object of the embodiment can be also attained by substituting the water shield part.

Figure 40:
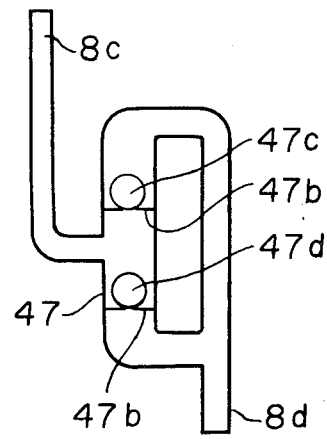

FIG. 40 is a sectional view of the embodiment of a valve device which imparts the same effect as that of the water shield part.

The reference numeral (47b) designates a ring valve seat; (47c) and (47d) designate balls which are respectively put on the valve seat (47b) by gravity so as to prevent free flowing of a fluid. The ball (30d) is made of a material having a lower specific gravity than that of water. Therefore, when the condensed water is fed through the passage (8c), the ball (8d) is floated to discharge water through the passage (8d) into the water receiver (11). When the pressure at the side of the column (1) is raised, the flow of the gas is prevented by the ball (47d). The dischrge of the gas is prevented until the pressure is raised to lift up the ball (47c).

When the pressure at the side of the column (11) is decreased, the ambient air is not fed until the pressure difference reaches to the pressure difference for lifting up the ball (47d). In the case of an abnormal pressure rising or falling, the ball (47c) or (47d) is lifted up to pass the gas. The valve device (30) shown in FIG. 40 impart the same effect as that of the U-shaped water shield part. The effect is attained without water at the valve part. Therefore, this is suitable for using instead of the U-shaped water shield part (46) in the system shown in FIG. 39.

Figure 41:
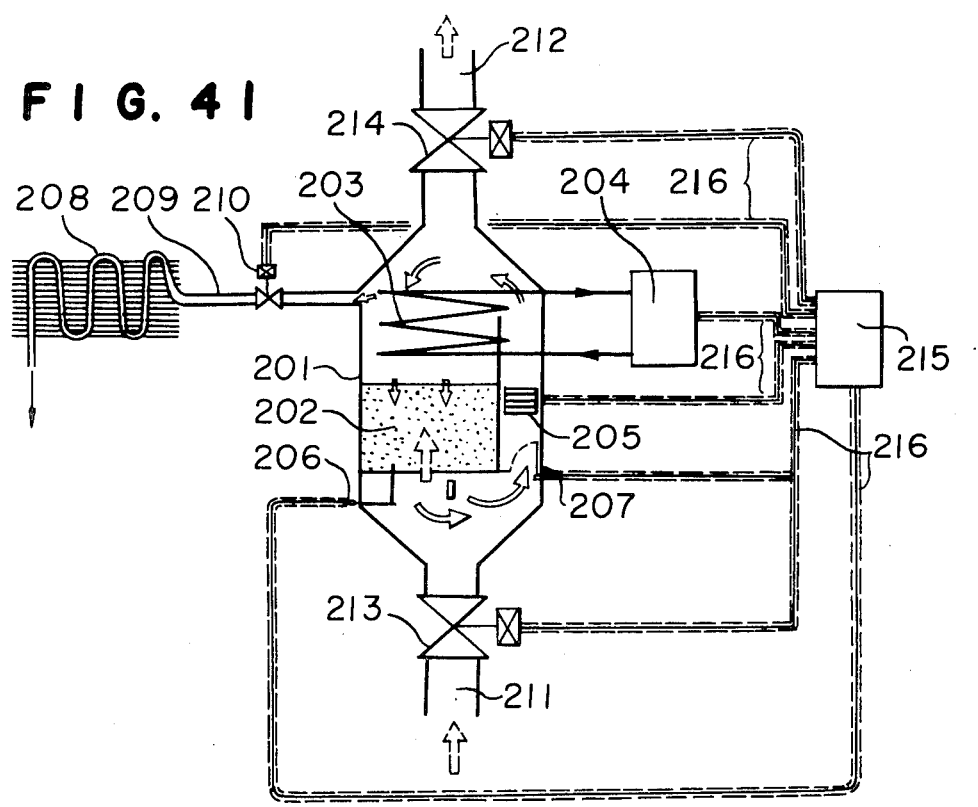

FIG. 41 is a schematic view of one embodiment which can impart automatical control of the adsorbing and desorbing operation.

In FIG. 41, the reference numeral (201) designates columns for adsorption and desorption (hereinafter referring to as column); (202) designates a solid adsorbent layer such as molecular sieve (hereinafter referring to as absorbent layer) placed in the column; (203) designates a heater; (204) designate a heat source for supplying heat energy to the heater (203); (205) designates a fan for recycling the gas in the column (201); (206) designates a temperature detector; (207) designates a valve connected to the recycling gas passage in the column; (208) designates a condenser; (209) designates a pipe connecting the column (201) and the condenser (208); (210) designates a valve connected to the pipe (209); (211) designates an inlet of the ambient air having a moisture; (212) designates an outlet of air after adsorbing the moisture by the adsorbent layer (202); (213) and (214) designate valves connected at the inlet (211) or the outlet; (215) designates a controller for electrically controlling the operation of movable parts; (216) designates an electrical wiring for connecting the controller (215) to the various movable parts.

In this embodiment, the valves (213), (214) are opened in the adsorbing step and the valve (207) in the recycling passage is closed to feed in the ambient air to the broken arrow line direction, so as to adsorb the moisture in the adsorbent layer (202). FIG. 41 shows the condition in the desorbing step after the adsorbing step. The valves (213), (214) are closed and the valve (207) in the recycling passage is opened. The recycling gas discharged by the recycling fan (205) is brought into contact with the heater (203) to be heated and is fed into the adsorbent layer (202).

The most of heat energy of the recycling gas given by the heater (203) is lost for desorbing the adsorbed water from the adsorbent layer (202) and heating the adsorbent layer (202) during passing the recycling gas through the adsorbent layer (202). The temperature of the recycling gas is lowered and the gas carries the desorbed steam to recycle through the suction side of the recycling fan (205). The temperature of the adsorbent layer (202) is monitored by the temperature detector at the downflow of the recycling gas. Thus, the pressure of the recycling gas in the column (201) is increased depending upon the formed steam. The increased steam portion is fed through the pipe (209) to the condenser (208) and is condensed into liquid water by cooling it and it fed out of the system as shown by the arrow line.

When the heat energy is supplied to the heater (203), the temperature of the adsorbent layer (202) and the amount of water obtained from the condenser (208) are gradually increased.

Figure 42:
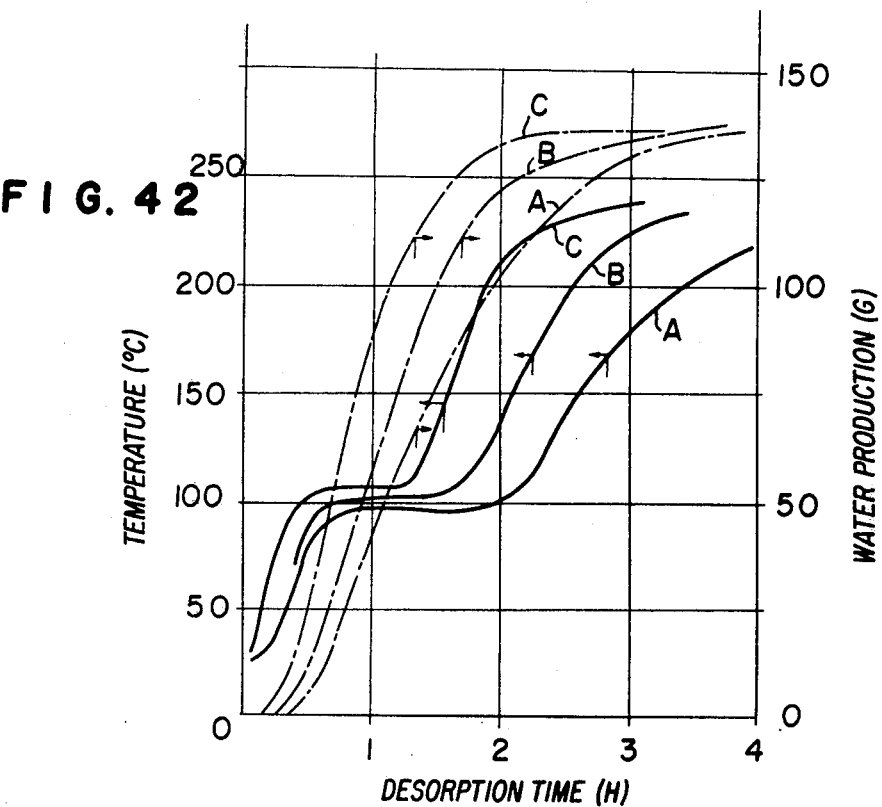
FIGS. 42 and 43 show the characteristic curves for the operations.
Figure 43:
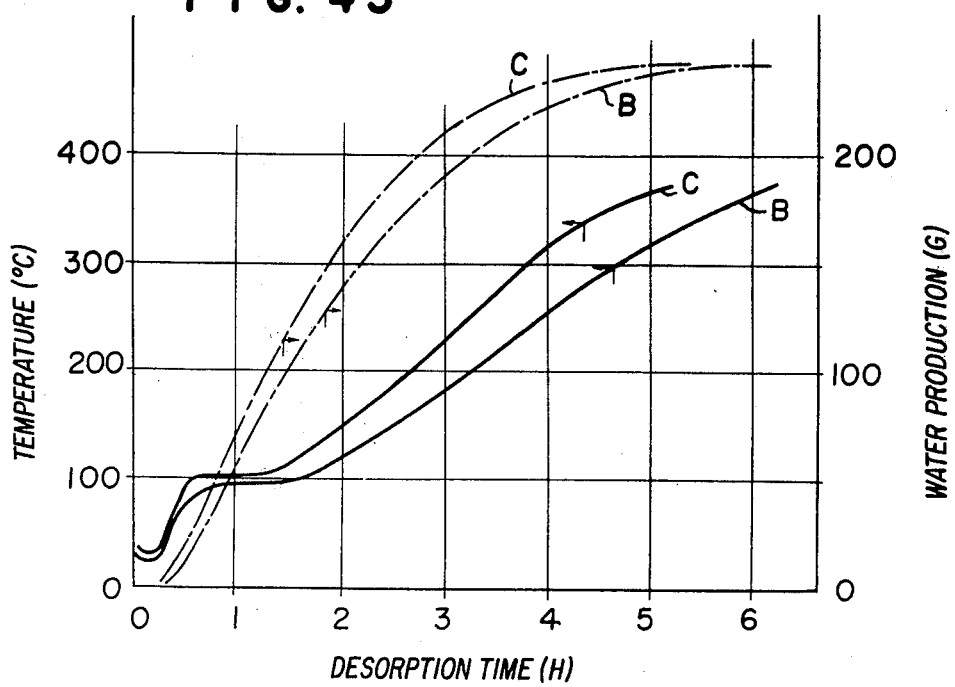

In FIG. 42 shows the desorption curves in the case using silica gel as the adsorbent and FIG. 43 shows the desorption curves in the case using molecular sieve wherein the full line curves show the temperature measured by the temperature detector (206); the dotted chain line curves show integrated value of water obtained at the outlet of the condenser (208). The operating condition of the water producing apparatus is shown in the Table.

TABLE

| Adsorbent | Spherical silica gel "Neobead SA" (Mizusawa Chem.) 6 to 10 mesh 1.5 kg. | Spherical molecular sieve 4A (Showa Unox) 4 to 8 mesh 1.4 kg. |
|---|---|---|
| Water content | 170 g. | 250 g. |
| Heater | 700 VA (Curve A) 930 VA (Curve B) 1200 VA (Curve C) | 1100 VA (Curve B) 1600 VA (Curve C) |
| Recycling gas | 30 to 65 l./min. | 30 to 65 l./min. |

In FIG. 42, in the region of the temperature of the temperature detector (206) over the constant temperature region, the relation of the temperature and the water production is substantially the same even though the heat energy of the heater (203) is varied. For example, the water production at 130° C. is 135 to 140 g. and the water production at 220° C. is 165 to 170 g.

As shown in FIG. 42 in order to obtain more than 85% of the maximum water production, the temperature should be higher than about 170° C. In order to obtain more than 90% of the maximum water production, the temperature should be higher than about 180° C.

When the silica gel is heated at higher than 350° C., the sintering is caused to decrease the capacity of water content and accordingly, the temperature should be lower than 350° C.

When the molecular sieve is used for the adsorbent, as shown in FIG. 43, the relation of the temperature and the water production shows the characteristic which is not depending upon the heat energy of the heater (203), at the temperature of higher than the constant temperature region.

As shown in FIG. 43, in order to obtain more than 85% of the maximum water production, the temperature should be higher than about 220° C. In order to obtain more than 90% of the maximum water production, the temperature should be higher than about 280° C.

In general, when the molecular sieve is heated at higher than 500° C., the capacity of water content is lower. Therefore, it is necessary to maintain the temperature to lower than 500° C.

When the temperature detected by the temperature detector (206) reaches to the specific temperature, it is considered to complete the desorption. The temperature is decided depending upon the desired water production and the economical condition, and it is optimum to be a range of 180° to 250° C. in the case of the silica gel and in a range of 220° to 400° C. in the case of the molecular sieve.

In the water producing apparatus of the present invention, it is considered to complete the desorbing step when the temperature at the bottom of the adsorbent layer (202) reaches to the specific temperature and the controller (15) automatically performs the operation for changing the state of the column of the water producing apparatus into the adsorbing step when the temperature signal is received. That is, the valves (213), (214) are opened and the operation of the fan (205) and the heater (203) is stopped and the valve (210) and the valve (207) in the recycling passage are closed and the fan for sucking (not shown) is driven to feed the ambient air in the column (201) for certain time to the broken arrow line direction.

In said embodiment, the temperature detector (206) is inserted in the bottom of the adsorbent layer (202). The position for the insertion is not limited and can be any position in the recycling gas passage from the bottom of the adsorbent layer (202) to the heater (203). The temperature detector (206) can be a thermocouple, a thermistor or the other heat sensitive resistor. The heat source (204) is preferably an oil combustion type one for feeding a combustion gas into the heater (203) in view of economy. Thus, an electric heating type heat source can be used for a small water producing apparatus.

We claim:

1. A water producing appartus comprising:

a housing;

at least two adsorbent containing chambers in said housing, each of said adsorbent containing chambers having an inlet and an outlet;

door means for said inlet and said outlet of each of said adsorbent containing chambers;

a recycling passage for each of said adsorbent containing chambers, each said recycling passage including means connected to each said adsorbent containing chamber on both sides of said adsorbent;

a heating chamber, including heating means, in each said recycling passage;

a common chamber common to all said outlets;

condenser means associated with said common chamber;

feed means adapted to feed air through at least one of said adsorbent containing chambers and into said common chamber; and means for selectively connecting the gas in each said recycling passage to said condenser means, whereby the air passing through the adsorbent containing chamber which is in the adsorbing step cools the gas in said condenser means.

2. The apparatus of claim 1 wherein said feed means comprises at least one blower associated with at least one said condenser and wherein each said blower and said condenser are movable as a unit, further including means for permitting each said unit to move into and substantially out of said common chamber.

* * * * *